United States Patent [19]

Führing

[11] Patent Number: 4,517,467
[45] Date of Patent: May 14, 1985

[54] WIND TURBINE WITH GALE PROTECTION

[75] Inventor: Heinrich Führing, Augsburg, Fed. Rep. of Germany

[73] Assignee: Messerschmidt-Bölkow-Blohm GmbH, Ottobrunn, Fed. Rep. of Germany

[21] Appl. No.: 516,786

[22] Filed: Jul. 25, 1983

[30] Foreign Application Priority Data

Jul. 24, 1982 [DE] Fed. Rep. of Germany ....... 3227700

[51] Int. Cl.³ .......................... F03D 7/02; F03D 7/04
[52] U.S. Cl. ...................................... 290/44; 290/55; 416/19
[58] Field of Search ....................... 290/44, 55; 416/19, 416/DIG. 2

[56] References Cited

FOREIGN PATENT DOCUMENTS 124935  4/1919  United Kingdom ................. 416/19

OTHER PUBLICATIONS

Scott, 2-Armed Monster, Popular Science, 1-1981.
Tayadev, IEEE, Windmills Stage a Comeback, 11-1976.

Primary Examiner—B. Dobeck
Assistant Examiner—Shelley Wade
Attorney, Agent, or Firm—Karl F. Ross; Herbert Dubno

[57] ABSTRACT

A wind turbine with a single rotor blade drives an alternator whose output is connected to an a-c network to supply same with power when the alternator acts as a generator under the driving force of the wind. The network establishes a synchronous speed for the alternator which corresponds to a rotor speed so chosen that a certain laminar flow along the blade will be maintained even at high wind velocities. Changing the pitch of the blade allows a wide range of wind velocities to be accommodated.

1 Claim, 4 Drawing Figures

WIND TURBINE WITH GALE PROTECTION

FIELD OF THE INVENTION

My present invention relates to a wind turbine having a rotor coupled with a generator of electrical energy.

BACKGROUND OF THE INVENTION

Such wind turbines usually have rotors designed as propellers with two or more blades. The power delivered by the rotor-driven generator is a function of wind velocity, depending on the profile of the propeller blades as well as on their pitch which can be adjusted by a variety of means (see, for example, U.S. Pat. Nos. 4,348,155 and 4,352,634). The rotor shaft is customarily mounted horizontal on a vertical mast which in turn can rotate to let the propeller, acting as a weather vane, find a position in a plane generally perpendicular to the prevailing wind direction.

A problem in such wind turbines is the danger of undue acceleration in the event of a gale. Protection against excessive wind velocities can be had by a feathering of the propeller blades or, if their pitch is not variable, by the extension of baffles or the application of a braking force.

According to the laws of aerodynamics, an air current has a tendency of detaching itself from a propeller surface—a condition referred to hereinafter as break-off—when the air speed along the blade surfaces becomes incompatible with laminar flow on account of excessive relative acceleration or retardation of the rotor. The art, however, appears to have been reluctant to apply this principle to a wind turbine, especially one of the single-blade type, for fear that such a break-off might give rise to the annoying phenomenon known as stall flutter.

OBJECTS OF THE INVENTION

The gneeral object of my present invention is to provide simple means for protecting such a wind turbine, operable with widely varying wind velocities, from being overdriven by gusts or gales in a manner liable to cause mechanical damage and/or to overload a power line energized by its generator.

A related object is to provide such a wind turbine with a blade structure able to withstand possible stall flutter.

SUMMARY OF THE INVENTION

Pursuant to my present invention, an electric generator driven by the rotor of a wind turbine of the kind referred to is designed as an alternator and, in operation, is connected to a branch of an a-c power line forming part, for example, of a 50-Hz or 60-Hz utility network. The alternator is coupled with the rotor of the wind turbine through a suitable speed changer designed to make the synchronous speed of the alternator—imposed upon it by the external power source—somewhat less than the driven speed at which the blade means of the turbine would be freely rotated by the wind in a predetermined range of normal velocities. Break-off will occur only when an excessive rise in wind velocity increases the difference between the theoretical driven speed and the synchronous speed to a value above that compatible with laminar flow. When the rotor has a blade of uniform profile throughout its length, without any twist, the component of the wind force perpendicular to the blade surface will be less at the free end of the blade than at its root so that the break-off may spread gradually from the root outward as wind speed increases. With a given wind velocity above the normal range, therefore, the outer part of the blade rotating at the synchronous speed may still be aerodynamically entrained so that the generator will continue to supply power to the network. When, however, there is little or no wind, the alternator may be disconnected from the network (preferably automatically by a current or wind-speed sensor) to avoid unnecessary consumption of electrical energy.

The use of a single-blade rotor allows for a particularly simple pitch control designed to vary the exerted driving torque with different wind velocities.

BRIEF DESCRIPTION OF THE DRAWING

The above and other features of my invention will now be described in detail with reference to the accompanying drawing in which.

SPECIFIC DESCRIPTION

Figure 1:
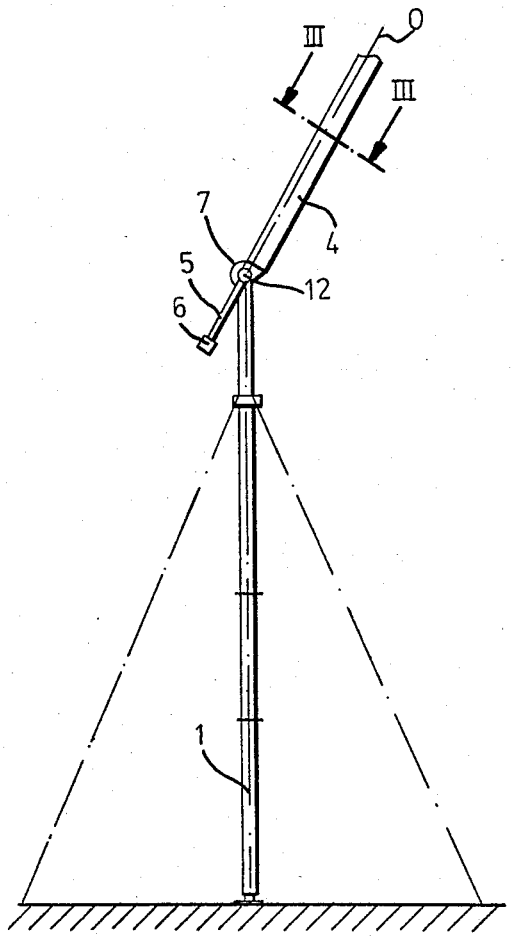
FIG. 1 is a front-elevational view of a single-blade wind turbine embodying my invention.
Figure 2:
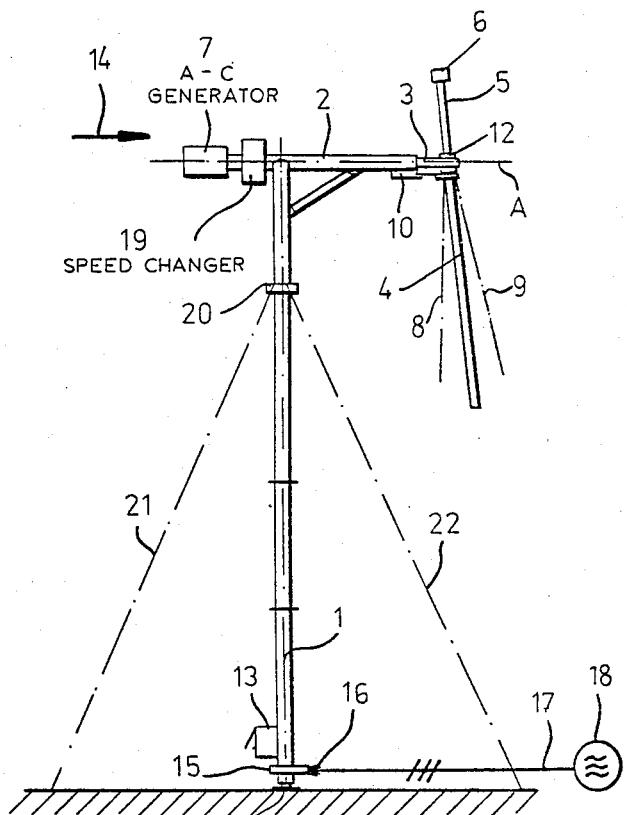
FIG. 2 is a side-elevational view of the same wind turbine in a different position of its rotor blade.

As shown in FIGS. 1 and 2, a tubular steel mast 1 supported in a thrust bearing has a vertical axis Q about which it is rotatable while being maintained in an upright position by a framework including a journal bearing 20 and cables 21, 22. Mounted at the top of mast 1 is a horizontal tube in which a shaft 3 is rotatable about its own axis A. A rotor blade 4 is articulated on a free end of shaft 3, remote from mast 1, by a flapping hinge, universal joint or similar swivel coupling 12 so as to be limitedly swingable, within the plane defined by axes Q and A, in a narrow angular range bounded by lines 8 and 9. Blade 4, which thus can adjust its position so as to be substantially perpendicular to a wind direction deviating somewhat from the horizontal, is balanced by a counterweight 6 carried on an extension 5 thereof. A hydraulic jack 10 with a spring-loaded piston enables an adjustment of the pitch of blade 4 by a swiveling about a longitudinal axis O thereof, e.g. between two positions indicated in full and in phantom lines in FIG. 3 and separated by an angle $\epsilon$ of about 30°.

Through a speed changer 19 at the opposite end of mounting tube 2, shaft 3 is coupled with an a-c generator 7 which may be an alternator of the 3-phase type and, via nonillustrated wires, is connected to a control box 13 at the foot of mast 1. Box 13, which rotates with mast 1, also includes an adjustable pressure source coupled with jack 10 by way of a nonillustrated hydraulic conduit to control the pitch of blade 4. The operating circuit of alternator 7 extends from box 13 via a slip ring 15 and a brush 16 to a branch 17 of a 3-phase utility network diagrammatically indicated at 18.

Figure 3:
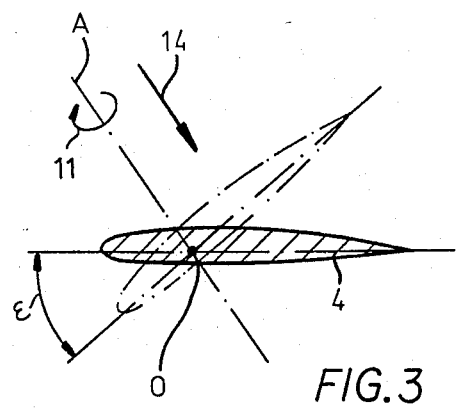
FIG. 3 is a cross-sectional detail view taken on the line III—III of FIG. 1.

Blade 4 is seen in FIG. 3 to have an aerodynamic profile which is constant throughout its length, thus giving it a substantially rectangular contour in the front view of FIG. 1 facing an assumed wind direction 14 parallel to shaft axis A. When the blade is pitched as shown in full lines in FIG. 3, i.e. with its rear surface (which confronts the mast 1) including an obtuse angle with the wind direction 14, it will rotate clockwise about the horizontal axis A as indicated by an arrow 11. An increase in pitch angle $\epsilon$, with reference to a zero-pitch position indicated in phantom lines, will let the blade 4 rotate at the same speed but under a reduced driving torque. By suitable choice of pitch angle $\epsilon$, therefore, the driving torque can be controlled in conformity with the existing wind velocity—preferably automatically with the aid of a sensor symbolized by box 13—to provide a surplus of electrical energy delivered by alternator 7 to network 18. This means that the (theoretical) driven speed of the rotor, which would exist if alternator 7 were disconnected from line 17, still exceeds the synchronous speed by a difference sufficiently limited to allow for the maintenance of laminar flow at least on parts of the blade's rear surface. The same sensor can also be used for operating a switch in box 13 serving to disconnect alternator 7 from line 17 when zero or low wind speed would convert same from a generator to a synchronous motor even with optimum pitch of blade 4. Such a sensor could be designed as an anemometer but could also detect the current generated or absorbed by alternator 7.

Figure 4:
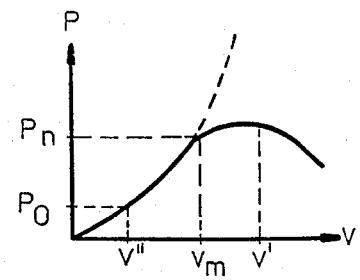
FIG. 4 is a graph relating to the power generation of the apparatus with different wind velocities.

In FIG. 4 the power P produced by alternator 7 has been plotted against wind velocity v. A nominal power $P_n$ generated at an average wind velocity $v_m$ is somewhat less than the maximum power obtainable at a higher wind speed v' with suitable setting of pitch $\epsilon$. Beyond that point, the power delivered by generator 7 begins to drop with increasing wind speeds on account of progressive break-off. With blade 4 in a nearby feathered position, stall flutter would be kept to a magnitude sustainable by the disclosed blade structure. At a low wind speed v'', the generator $P_O$ is no longer sufficient to deliver energy to network 18 even in the full-line position of FIG. 3 so that the circuit should be interrupted at this point if consumption of external electrical energy is to be avoided.

My improved wind turbine is therefore able to operate efficiently with widely varying wind velocities. Except under extraordinary atmospheric conditions, only a limited pitch-angle adjustment will be needed to reduce the driving torque with increasing wind velocities and vice versa in order to adapt the turbine to different operating conditions.

I claim:

1. A wind turbine comprising, in combination:

a rotor having wind-driven blade means formed by a single blade on a shaft generally parallel to a prevailing wind direction;

an electrical power generator coupled with said shaft, said power generator being an alternator connected in operation to an external alternating-current source imposing upon said alternator a synchronous speed less than a theoretical speed at which said rotor would be driven by wind velocities in a predetermined range if disconnected from said external source, said blade having a substantially constant aerodynamic profile in transverse section and a substantially rectangular contour in a longitudinal plane, said shaft being horizontally mounted atop an upright mast rotatable about a vertical axis, said blade being connected with an end of said shaft remote from said mast by a swivel coupling enabling limited swinging in a plane defined by the axis of said mast and said shaft; and pitch-control means coupled with said blade for varying an angle of inclination included between said shaft and a rear surface of said blade confronting said mast, said pitch-control means including sensing means for orienting said blade in a manner maintaining laminar air flow over at least part of said rear surface with different wind velocities.

* * * * *